No. 855,313. PATENTED MAY 28, 1907.
C. E. HOLBROOK.
FURROW PLOW AND ROLLER.
APPLICATION FILED AUG. 15, 1906.
2 SHEETS—SHEET 1.
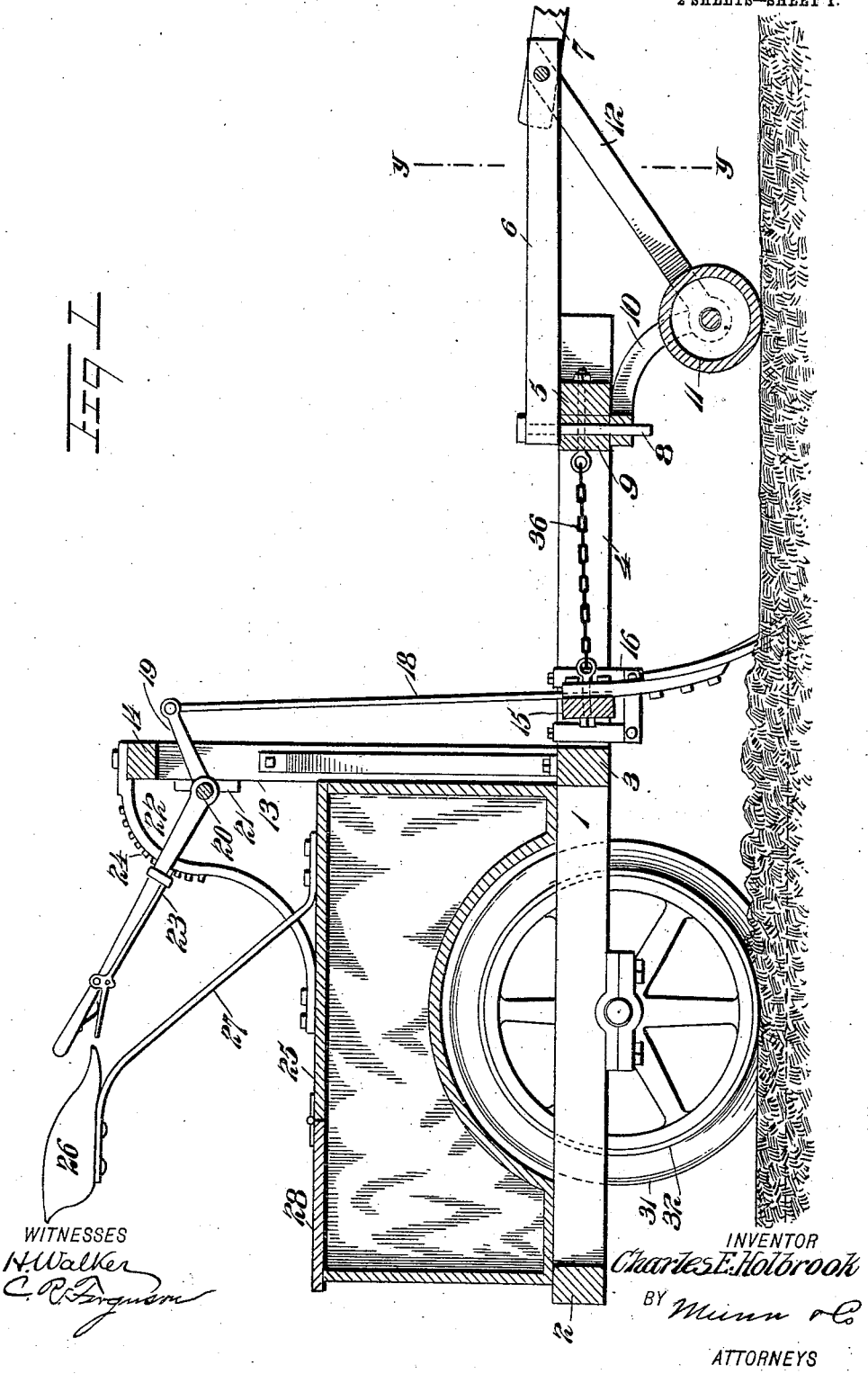
WITNESSES
INVENTOR
Charles E. Holbrook
BY
Munn & Co
ATTORNEYS No. 855,313. PATENTED MAY 28, 1907.
C. E. HOLBROOK.
FURROW PLOW AND ROLLER.
APPLICATION FILED AUG. 15, 1906.
2 SHEETS—SHEET 2.
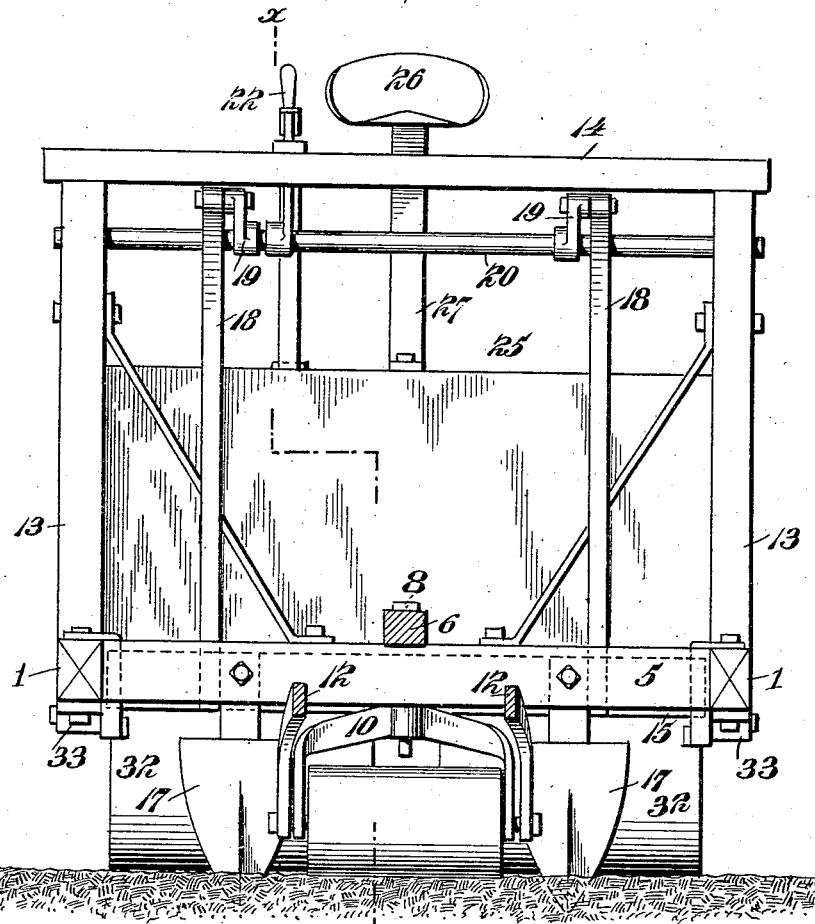
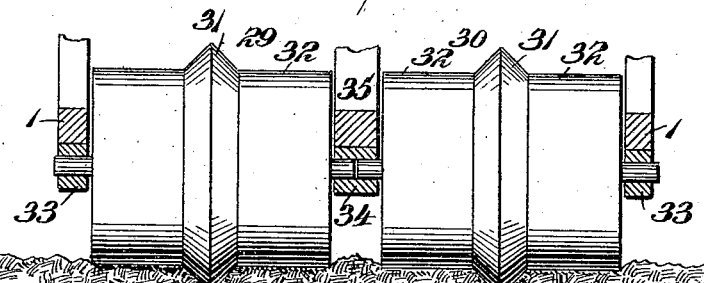
WITNESSES
H. Walker
C. R. Ferguson
INVENTOR
Charles E. Holbrook
BY Munn & Co.
ATTORNEYS
THE NORRIS PETERS CO., WASHINGTON, D. C.

UNITED STATES PATENT OFFICE.

CHARLES E. HOLBROOK, OF CARSON CITY, NEVADA.

FURROW PLOW AND ROLLER.

No. 855,313.  Specification of Letters Patent.  Patented May 28, 1907.

Application filed August 15, 1906. Serial No. 330,658.

*To all whom it may concern:*

Be it known that I, CHARLES E. HOLBROOK, a citizen of the United States, and a resident of Carson City, in the county of Ormsby and State of Nevada, have invented a new and Improved Furrow Plow and Roller, of which the following is a full, clear, and exact description.

This invention relates to improvements in furrowing or ditching plows and rollers, for irrigation, the object being to provide a device of this character, that will be comparatively light to draw over the ground to form the ditches and to smooth the banks, sides and bottom of the ditches.

I will describe a furrow plow and roller embodying my invention and then point out the novel features in the appended claims.

Reference is to be had to the accompanying drawings forming a part of this specification, in which similar characters of reference indicate corresponding parts in all the figures.

Figure 1 is a sectional elevation on the line $x$—$x$ of Fig. 2 of a furrow plow and roller embodying my invention; Fig. 2 is a front elevation thereof, partly in section, on the line $y$—$y$ of Fig. 1, and Fig. 3 is a front view of the roller.

The main frame of the machine comprises side sills 1 connected at the rear end by a cross bar 2 and about the middle portion by a cross bar 3; the side sills extend forward from the cross bar 3 as indicated at 4, and these forward extensions are connected near the front end by a cross bar 5 to which the draft tongue has connection. As here shown, the draft tongue consists of a member 6 and a member 7, having vertical swinging connection with the member 6, but is held from lateral movement with relation thereto. The member 6 is mounted to swing on a bolt 8 which presses downward through a bearing 9 secured to the cross bar 5, and mounted to swing on this bolt below the cross bar 5 is a yoke 10 in which a steering roller 11 has its shaft bearings; and extended upward from the shaft bearings and to rigid connection with the member 6 of the tongue, are braces 12. Obviously, by means of the roller 11 the machine, that is the rear portion thereof, may be steered or guided as desired, by the lateral movement of the tongue. Extended upward from the side sills here shown as at the junction of said sills with the intermediate cross bar, are standards 13 connected at the top by a cross bar 14; and forward of these standards is a plow beam 15 which is vertically movable at its ends in the guide clips 16 secured to said forward projections 4 of the sills. To this beam 15 the plow points 17 are attached; these plow points have convergent side edges which extend practically to a point at the lower end.

As a means for raising and lowering the plow points as occasion may require, rods 18 are extended upward to pivotal connection with arms 19 extended forward from a rock shaft 20 having bearings in blocks 21 attached to the standards 13.

Extended rearward from the rock shaft 20 is an operating lever 22 which carries a spring-pressed pawl 23 for engaging between any pair of teeth on a segment-rack 24 secured at the upper end to the cross bar 14 and at the lower end to a tool-box 25.

The operating lever 22 extends to a convenient position to be operated by a driver on the seat 26 supported on a standard 27 secured to the top of the tool-box. This tool-box as here shown has at its rear end a swinging cover 28. Arranged rearward of the plow points is the smoothing roller which also forms a support for the rear portion of the machine. This smoothing roller preferably consists of two sections 29, 30, each having at its center, and in alinement with a plow point, a smoothing ring 31 which corresponds in shape in cross-section, to the shaft of the plow points. At opposite sides of these ring portions 31 the roller sections are cylindrical as indicated at 32.

The shafts of the roller sections, at the outer ends, have bearings in boxes 33 secured to the sills 1; at the inner ends the shafts have bearings in a box 34 secured to a central, longitudinally disposed sill 35.

In operation, as the machine is drawn along, the plow points will cut a V-shaped ditch in which the portions 31 of the smoothing roller will follow to smooth the walls, and the dirt thrown upward and outward by the plow points will be smoothed or flattened by the plain cylindrical portions 32 of the roller.

It will be noted that the plow beam 15 is connected to the cross bar 5 by means of chains 36, permitting a free up and down movement of said plow beam, but causing the draft to be exerted directly thereon.

Having thus described my invention I claim as new and desire to secure by Letters Patent:

A machine for the purpose set forth, comprising a frame, plows supported in the frame, a roller journaled in the frame behind each of the plows, said rollers comprising a central ring corresponding in cross section to the shape of the plow point, and a cylindrical portion upon each side of the ring, said cylindrical portions being of lesser diameter than the ring, and said central ring being directly behind the plow point, whereby said ring will enter and smooth the furrow formed by the plow, and the cylindrical portions will press and smooth the ground adjacent to the edges of the furrow.

In testimony whereof I have signed my name to this specification in the presence of two subscribing witnesses.

CHARLES E. HOLBROOK.

Witnesses:
  RICHARD BARBER,
  ESTHER BARBER.